(12) United States Patent
Okuyama

(10) Patent No.: US 7,236,263 B2
(45) Date of Patent: Jun. 26, 2007

(54) IMAGE PROCESSING SYSTEM AND METHOD FOR IMPROVED COLOR CONVERSION

(75) Inventor: Hiroyuki Okuyama, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1052 days.

(21) Appl. No.: 10/259,857

(22) Filed: Sep. 30, 2002

(65) Prior Publication Data

US 2004/0061880 A1    Apr. 1, 2004

(51) Int. Cl.
H04N 1/60 (2006.01)
H04N 1/40 (2006.01)
G06K 15/00 (2006.01)

(52) U.S. Cl. .................. 358/1.9; 358/3.01; 358/3.27; 358/3.03

(58) Field of Classification Search .............. 358/1.9, 358/3.01, 3.27, 3.03, 533; 382/261, 264
See application file for complete search history.

(56) References Cited

U.S. PATENT DOCUMENTS 5,283,671 A * 2/1994 Stewart et al. .............. 358/532
6,710,896 B1 * 3/2004 Takaoka ..................... 358/1.9
2002/0159106 A1 * 10/2002 Fuchigami et al. ......... 358/518
2003/0048958 A1 * 3/2003 Ishiguro ..................... 382/261

FOREIGN PATENT DOCUMENTS

| JP | 11-146215 A | 5/1999 |
|---|---|---|
| JP | 11-225279 A | 8/1999 |
| JP | 2000-278539 A | 10/2000 |

\* cited by examiner

Primary Examiner—Madeleine Nguyen
Assistant Examiner—Houshang Safaipour
(74) Attorney, Agent, or Firm—Foley & Lardner LLP

(57) ABSTRACT

A system and method for processing image data generates color image data from a scanned image, the color image data including RGB data, converts the RGB data to CMY data, and translates the CMY data for the pixel to CMYK data. A weighting coefficient is set for a pixel based on the values of the CMY data for the pixel. A particular region in which the pixel is located is identified as a black color region or a non-black color region. The value of the K data for the pixel is altered based on the weighting coefficient if the particular region is a non-black color region.

21 Claims, 4 Drawing Sheets

US 7,236,263 B2

IMAGE PROCESSING SYSTEM AND METHOD FOR IMPROVED COLOR CONVERSION

FIELD OF THE INVENTION

The present invention relates generally to image processing, and more particularly to a system and method for improving color conversions to provide for more accurate color reproduction.

BACKGROUND OF THE INVENTION

Hardcopy devices, such as photocopiers, scanners and printers, are capable of reproducing color images from color documents and photographs. To reproduce the color images, the images from the color documents or photographs are sensed and reproduced based upon tristimulus values, whose amplitude is proportional to radiance, but whose spectral composition is carefully chosen according to the principles of color science. Tristimulus values in typical imaging systems are represented as red, green and blue (RGB), which are linear light values. In the typical imaging systems, the RGB tristimulus values are subjected to a nonlinear transfer function, such as gamma correction, that mimics the lightness response of vision. The resulting non-linear light values may be represented as R'G'B' tristimulus values.

A digitized color image is represented as an array of pixels, where each pixel contains numerical components that define a color. The systems that may be used for image coding include the linear RGB and nonlinear R'G'B' systems described above. Other image coding systems include non-linear cyan, magenta and yellow (CMY), nonlinear CMY and black (CMYK), and derivatives of these coding systems. Cyan in tandem with magenta produces blue, cyan with yellow produces green and yellow with magenta produces red. The CMY values are typically derived from the RGB or R'G'B' values, and the K value is typically derived from the CMY values.

In a color image, there are regions that include black and regions that do not include black. These regions can be referred to as black color regions and non-black color regions. The non-black color regions may correspond to regions of light tones, such as regions incorporating skin color. After an image is scanned, RGB data is generated and can be converted to CMY data. The CMY data is then used to determine the K data or black level for each pixel. In a conventional system, the K data or black level is generated regardless of whether the pixel is in a black color region or a non-black color region. As a result, when the image is reproduced from the CMYK data, non-black color regions may be printed with some black. For example, the reproduction of a skin color region may include black dots, which are not close to the real skin color.

SUMMARY OF THE INVENTION

Briefly, in one aspect of the present invention, a method for processing image data generates color image data from a scanned image, the color image data including RGB data, converts the RGB data to CMY data, and translates the CMY data for the pixel to CMYK data. A weighting coefficient is set for a pixel based on the values of the CMY data for the pixel. A particular region in which the pixel is located is identified as a black color region or a non-black color region. The value of the K data for the pixel is altered based on the weighting coefficient if the particular region is a non-black color region.

DETAILED DESCRIPTION OF THE PREFERRED EMBODIMENT

Figure 1:
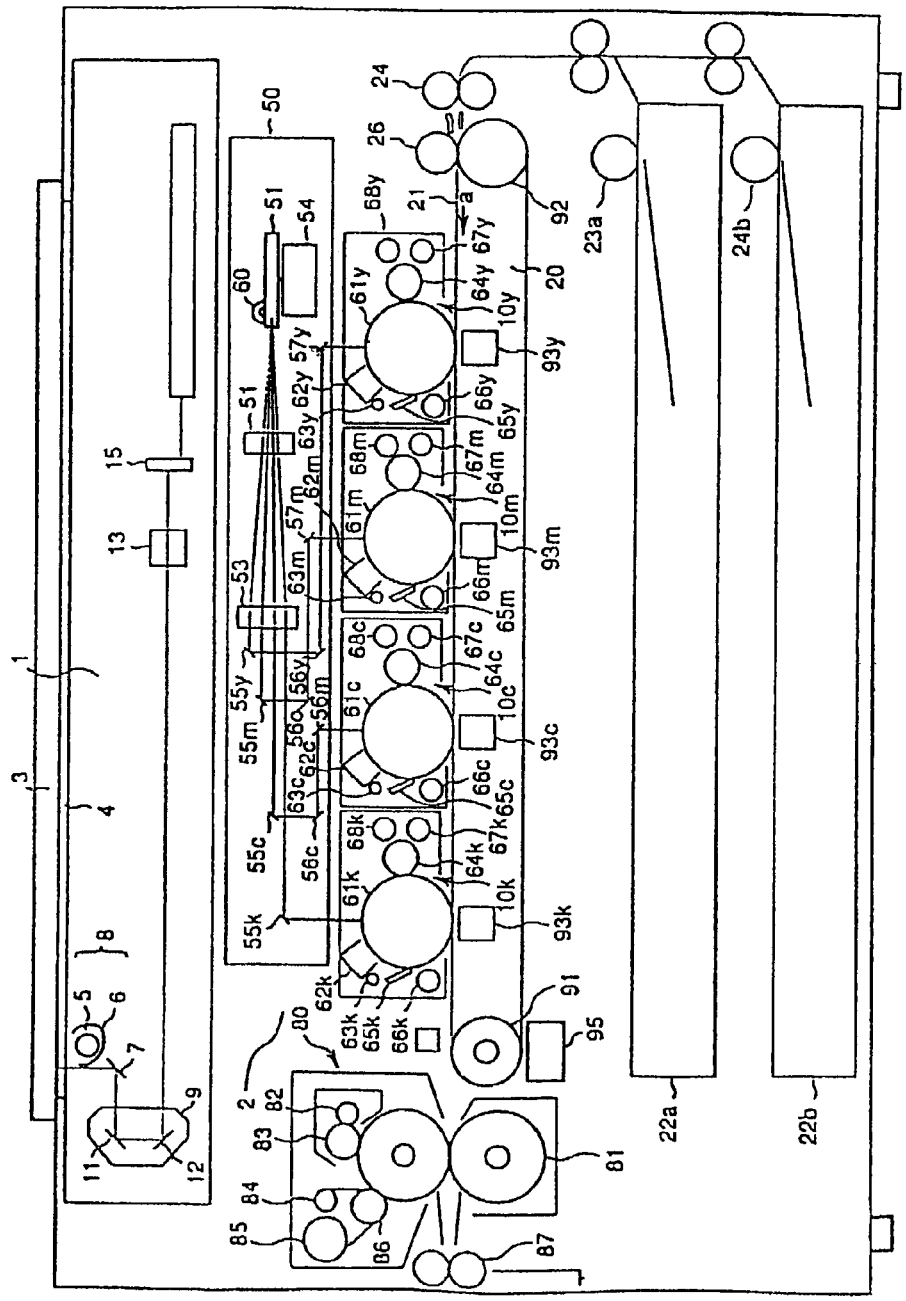
FIG. 1 shows a sectional view of an image forming apparatus consistent with the present invention.

FIG. 1 shows a sectional view of an image forming apparatus consistent with the present invention. The image forming apparatus may be a hardcopy device such as a digital type color copier for forming a copied image of a color image. As shown in FIG. 1, the image forming apparatus includes a color scanner portion 1, which scans and reads a color image on a document and a color printer portion 2, which forms a copied image of the color image.

The color scanner portion 1 includes a document base cover 3 at an upper portion thereof. A document base 4 is arranged opposite to the document base cover 3 in a closed state and includes transparent glass on which the document is set. On a lower side of the document base 4 are arranged an exposure lamp 5 for illuminating the document mounted on the document base 4, a reflector 6 for focusing light from the exposure lamp 5 to the document and a first mirror 7 for reflecting the light from the document. The exposure lamp 5, the reflector 6 and the first mirror 7 are fixed to a first carriage 8. The first carriage 8 is moved by a pulse motor, not illustrated, along a lower face of the document base 4.

A second carriage 9 is arranged in a direction in which the light is reflected by the first mirror 7 and provided movably in parallel with the document base 4 via a drive mechanism, such as a belt with teeth in conjunction with a direct current motor or the like. The second carriage 9 includes a second mirror 11 for reflecting the light from the first mirror 7 to a third mirror 12. The third mirror 12 then reflects the light from the second mirror 11. The second carriage 9 is driven by the first carriage 8 and is moved along the document base 4 in parallel therewith at half the speed of the first carriage 8.

A focusing lens 13 focuses the light reflected from the third mirror 12 by a predetermined magnification. A CCD type color image sensor or photoelectric conversion element 15 converts the reflected light focused by the focusing lens 13 into an electric signal.

When light from the exposure lamp 5 is focused on the document on the document base 4 by the reflector 6, the reflected light from the document is made to be incident on the color image sensor 15 via the first mirror 7, the second mirror 11, the third mirror 12 and the focusing lens 13. At the color image sensor 15, the incident light is converted into an electric signal in accordance with the three primary colors of light of R (red), G (green) and B (blue).

The color printer portion 2 includes first through fourth image forming portions 10*y*, 10*m*, 10*c* and 10*k*. These image forming portions form images that are subjected to color decomposition for respective color components. In particular, the images are decomposed into the four colors of yellow (y), magenta (m), cyan (c) and black (k) according to known decomposition methods, such as the subtractive mixing method.

A transfer mechanism 20, which includes a transfer belt 21, transfers the images of the respective colors formed by the respective image forming portions in a direction shown by the arrow marked "a" in FIG. 1. The transfer belt 21 is wound to expand between a drive roller 91 rotated by a motor in the direction shown by the arrow marked "a," and a drive roller 92 separated from the drive roller 91 by a predetermined distance rotating at a constant speed in the direction of the arrow marked "a." The image forming portions 10y, 10m, 10c and 10k are arranged in series along a transfer direction of the transfer belt 21.

The image forming portions 10y, 10m, 10c and 10k include photosensitive drums 61y, 61m, 61c and 61k, respectively, as image carriers. Outer peripheral faces of the drums are formed in the same direction at respective positions in contact with the transfer belt 21. The photosensitive drums 61y, 61m, 61c and 61k are rotated at a predetermined speed by a motor.

The photosensitive drums 61y, 61m and 61c and 61k are arranged such that their axis lines are respectively disposed at equal intervals and are arranged such that the axis lines are orthogonal to the direction that the images are transferred by the transfer belt 21. The directions of the axis lines of the photosensitive drums 61y, 61m, 61c and 61k are defined as main scanning directions (second direction). The rotational directions of the photosensitive drums 61y, 61m, 61c and 61k, which correspond to a rotational direction of the transfer belt 21 (the arrow marked "a"), are defined as subscanning directions (first direction).

Electricity charging apparatus 62y, 62m, 62c and 62k, electricity removing apparatus 63y, 63m, 63c and 63k and developing rollers 64y, 64m, 64c and 64k are all extended in the main scanning direction. Lower agitating rollers 67y, 67m, 67c and 67k, upper agitating rollers 68y, 68m, 68c and 68k, transcribing apparatus 93y, 93m, 93c and 93k, and cleaning blades 65y, 65m, 65c and 65k also extend in the main scanning direction. Discharged toner recovery screws 66y, 66m, 66c and 66k are arranged successively along the rotational direction of the photosensitive drums 61y, 61m, 61c and 61k.

Transcribing apparatus 93y, 93m, 93c and 93k are arranged at positions sandwiching the transfer belt 21 between them. Corresponding ones of the photosensitive drums 61y, 61m, 61c and 61k are arranged on an inner side of the transfer belt. Further, exposure points by an exposure apparatus 50 are respectively formed on the outer peripheral faces of the photosensitive drums 61y, 61m, 61c and 61k between the electricity charging apparatus 62y, 62m, 62c and 62k and developing rollers 64y, 64m, 64c and 64k.

Sheet cassettes 22a and 22b are arranged on a lower side of the transfer mechanism 20 and contain sheets of the sheet P as image forming media for transcribing images formed by the respective image forming portions 10y, 10m, 10c and 10k. Pickup rollers 23a and 23b are arranged at end portions on one side of the sheet cassettes 22a and 22b and on sides thereof proximate to the drive roller 92. Pickup rollers 23a and 23b pick up the sheet P contained in the sheet cassettes 22a and 22b sheet by sheet from topmost portions of the sheets. A register roller 24 is arranged between the pickup rollers 23a and 23b and the drive roller 92. The register roller 24 matches a front end of the sheet P picked from the sheet cassette 22a or 22b and a front end of a toner image formed at the photosensitive drum 61y of the image forming portion 10y. Toner images formed at the other photosensitive drums 61y, 61m and 61c are supplied to respective transcribing positions in conformity with transfer timings of the sheet P transferred on the transfer belt 21.

An adsorbing roller 26 is arranged between the register roller 24 and the first image forming portion 10y, at a vicinity of the drive roller 92, such as above an outer periphery of the drive roller 92 substantially pinching the transfer belt 21. The adsorbing roller 26 provides electrostatic adsorbing force to the sheet P transferred at predetermined timings via the register roller 24. The axis line of the adsorbing roller 26 and the axis line of the drive roller 92 are set to be in parallel with each other.

A positional shift sensor is arranged at one end of the transfer belt 21, and at a vicinity of the drive roller 91, such as above an outer periphery of the drive roller 91 substantially pinching the transfer belt 21. The positional shift sensor detects a position of the image formed on the transfer belt 21. The positional shift sensor may be implemented, for example, as a transmitting type or a reflecting type optical sensor.

A transfer belt cleaning apparatus 95 is arranged on an outer periphery of the drive roller 91 and above the transfer belt 21 on the downstream side of the positional shift sensor 96. The transfer belt cleaning apparatus 95 removes toner or paper dust off the sheet P adhered onto the transfer belt 21.

A fixing apparatus 80 is arranged to receive the sheet P when it detaches from the transfer belt 21 and transfers the sheet P further. The fixing apparatus 80 fixes the toner image on the sheet P by melting the toner image transcribed onto the sheet P by heating the sheet P to a predetermined temperature. The fixing apparatus 80 includes a pair of heat rollers 81, oil coating rollers 82 and 83, a web winding roller 84, a web roller 85 and a web pressing roller 86. After the toner formed on the sheet P is fixed to the sheet, the sheet P is discharged by a paper discharge roller pair 87.

The exposure apparatus 50 forms electrostatic latent images subjected to color decomposition on the outer peripheral faces of the photosensitive drums 61y, 61m, 61c and 61k. The exposure apparatus is provided with a semiconductor laser oscillator 60 controlled to emit light based on image data (Y, M, C, K) for respective colors subjected to color decomposition by an image processing apparatus 36.

On an optical path of the semiconductor laser oscillator 60, there are successively provided a polygonal mirror 51 rotated by a polygonal motor 54 for reflecting and scanning a laser beam light and fθ lenses 52 and 53 for correcting and focusing a focal point of the laser beam light reflected via the polygonal mirror 51. First folding mirrors 55y, 55m, 55c and 55k are arranged between the fθ lens 53 and the photosensitive drums 61y, 61m, 61c and 61k. The first folding mirrors 55y, 55m, 55c and 55k fold or reflect the laser beam light of respective colors that have passed through the fθ lens 53 toward the exposure positions of the photosensitive drums 61y, 61m, 61c and 61k. Second and third folding mirrors 56y, 56m, 56c and 57y, 57m and 57c further fold or reflect the laser beam light folded by the first folding mirrors 55y, 55m and 55c. The laser beam light for black is folded or reflected by the first folding mirror 55k and thereafter guided onto the photosensitive drum 61k without detouring other mirrors.

Figure 2:
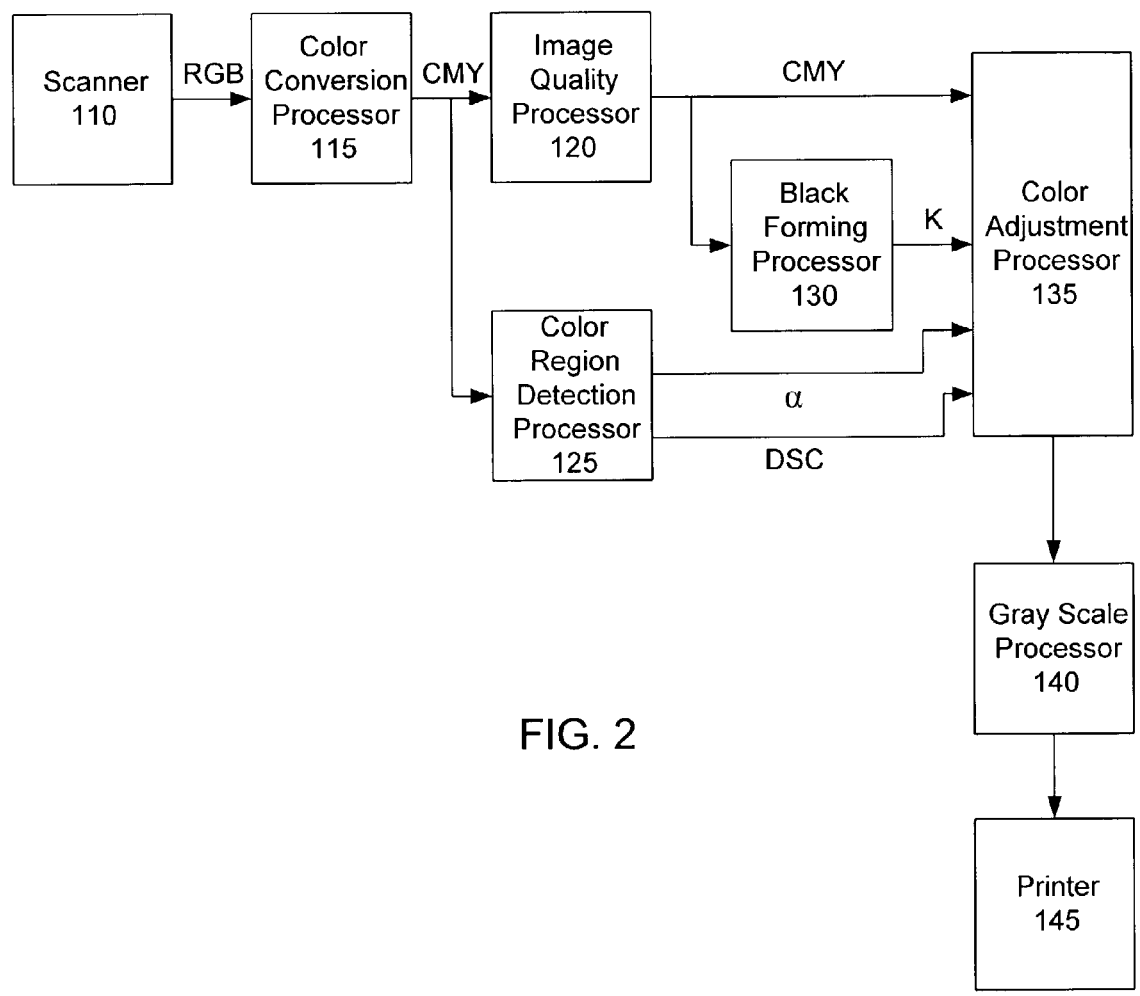
FIG. 2 is a block diagram of a color conversion system consistent with the present invention.

FIG. 2 is a block diagram of a color conversion system consistent with the present invention. As shown in FIG. 2, the color conversion system includes a scanner 110, a color conversion processor 115, an image quality processor 120, a color region detection processor 125, a black generation processor 130, a color adjustment processor 135, a halftoning processor 140 and a printer 145. The function and operation of each of these elements of the color conversion system will be explained in conjunction with the color conversion process of FIG. 3.

Figure 3:
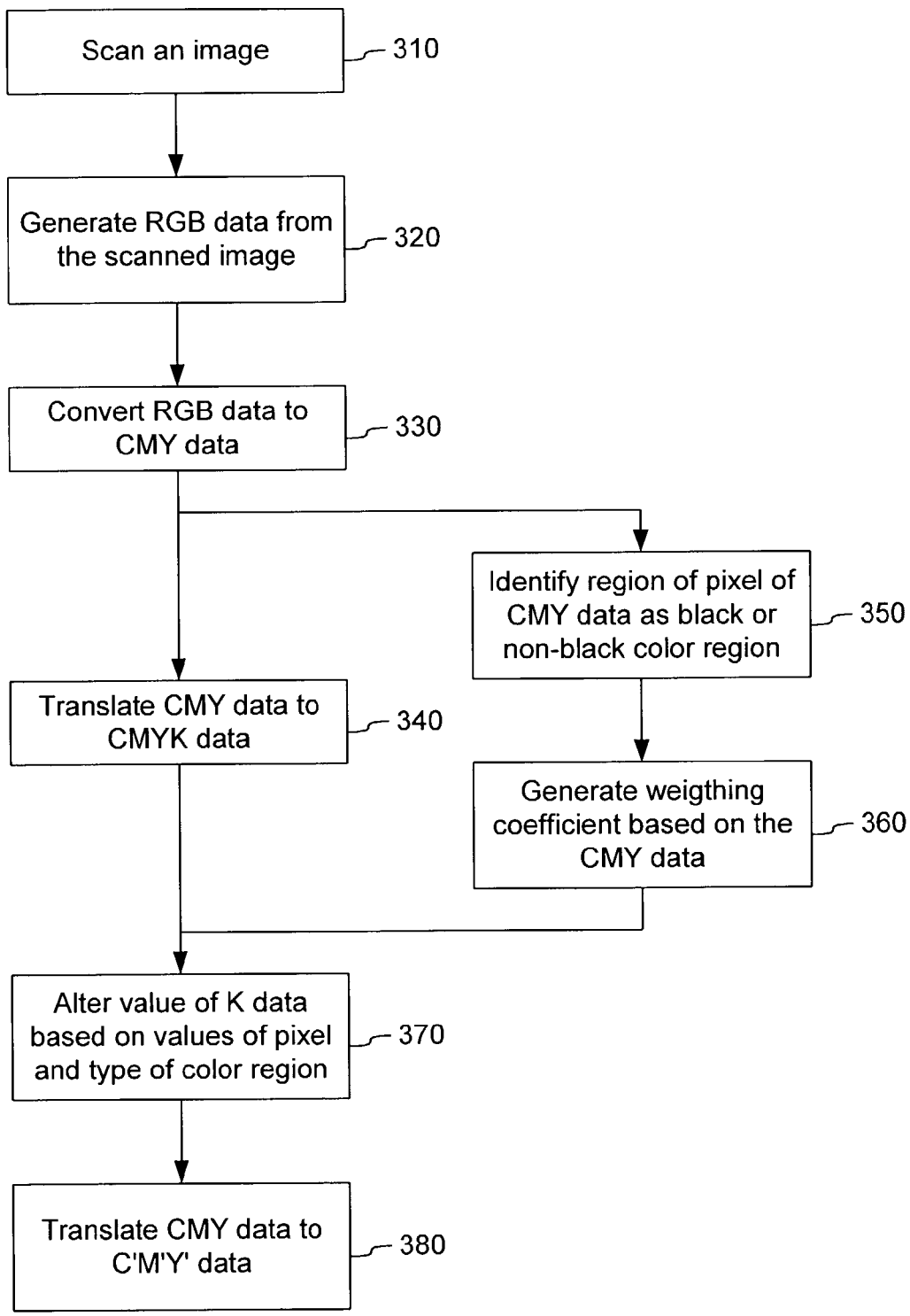
FIG. 3 is a flow diagram for a color conversion process consistent with the present invention.

FIG. 3 is a flow diagram for a color conversion process consistent with the present invention. As shown in FIG. 3, the first step in the color conversion process is to scan an image (step 310). To scan the image, a user places a document having an image on a scanning surface of the scanner 110, and the scanner 110 scans the document placed on the scanning surface. The scanner 110 may include a laser and optical system to scan the document on the scanning surface. The scanner 110 may be an independent device that provides color image data to a computer system. Alternatively, the scanner 110 may be part of a multi-function device, such as a combination scanner and printer. For example, a digital printer can include the scanner 110.

The scanned image is used to generate color image data (step 320). The color image data can be in the form of RGB data. The RGB data includes all of the pixels of the scanned image, where each pixel has an R value, a G value and a B value. Each value represents a tone level. For each value, there may be 256 tone levels, although more or fewer tone levels can be used as well, depending on the resolution setting of the scanner 110.

The RGB data is converted to CMY data (step 330). The conversion of the RGB data to CMY data can be performed by the color conversion processor 115. The conversion of RGB data into CMY data is a standard translation understood by one skilled in the art. In performing the conversion of RGB data into CMY data, it is possible to translate the RGB data into one or more intermediate formats before translating into CMY data. The color conversion processor 115 may be implemented in hardware, in software or some combination thereof. For example, the color conversion processor 115 may be implemented as an integrated circuit or as part of a software application operating on a computing device. The computing device may be the scanner 110, the printer 145, a personal computer (PC), some combination of these devices, or any other device capable of receiving, processing and transmitting image data.

The CMY data generated by the color conversion processor is received by the image quality processor 120 and the color region detection processor 125. The image quality processor 120 provides several color processing functions including, for example, filtering processing, magnification and reduction processing, and under color removal (UCR) processing. The image quality processor 120 thereby improves the image quality of the CMY data received from the color conversion processor 115, and outputs the improved CMY data to the black generation processor 130 and the color adjustment processor 135. Like the color conversion processor 115, the image quality processor 120 may be implemented in hardware, in software or some combination thereof, such as an integrated circuit or as part of a software application operating on a computing device.

The black generation processor 130 receives the CMY data from the image quality processor 120 and generates K data for each pixel of the CMY data (step 340). K data corresponds to the amount of black in each pixel. Like the translation of RGB data to CMY data, the generation of K data from the CMY data can be performed with a standard translation that is well known to one skilled in the art. The black generation processor 130 may be implemented in hardware, in software or some combination thereof, such as an integrated circuit or as part of a software application operating on a computing device.

As described above, after an image is scanned, RGB data is generated and converted to CMY data. The CMY data is then used to determine the K data or black level for each pixel. In a conventional system, the K data or black level is generated regardless of whether the pixel is in a black color region or a non-black color region. As a result, when the image is reproduced from the CMYK data, non-black color regions may be printed with some black. For example, the reproduction of a skin color region may include black dots, which are not close to the real skin color.

To improve the reproduction of non-black color regions, the color conversion system of FIG. 3 includes the color region detection processor 125. The color region detection processor 125 receives the CMY data from the color conversion processor 115. The color region detection processor 125 may be implemented in hardware, in software or some combination thereof, such as an integrated circuit or as part of a software application operating on a computing device.

The color region detection processor 125 performs two different functions. First, the color region detection processor 125 identifies a region in which a pixel is present as a black or non-black color region (step 350). To determine whether a pixel is present in a black or non-black color region, the color region detection processor 125 can refer to pixels surrounding the pixel in question. The number of pixels may vary, both in number an in shape. For example, the color region processor 125 may refer to a 5×5 square region of pixels, with the pixel in question in the center. The color region detection processor 125 then analyzes the CMY values of each of the pixels in the reference region, and based on this analysis, determines whether the pixel in question is in a black or non-black color region.

Other methods may also be used to determine if the pixel is in a black or non-black color region. For example, a listing or table can be prepared and maintained of all possible combinations of CMY values. Each combination of CMY values would have an indication of whether it is a black or non-black color region. The CMY value of the pixel in question can be matched against this listing or table, and the indication associated with the matched value would determine whether the CMY value of the pixel in question is in a black or non-black color region.

Based on the result of the determination, the color region detection processor 125 outputs a discrimination (DSC) signal. If the pixel is determined to be in a black color region, the DSC signal has a value of zero. If the pixel is determined to be in a non-black color region, the DSC signal has a value of one. The DSC signal may have different values as well. The value of the DSC signal is to indicate the type of region in which the pixel is located.

In addition to determining if the pixel is in a black or non-black color region, the color region detection processor 125 sets a weighting coefficient based on the CMY values of the pixel (step 360). The coefficient $\alpha$ may have a value between zero and one, where the value is closer to zero when the K data or black value should be decreased.

To determine the value of the coefficient $\alpha$, the color region detection processor 125 may refer to a lookup table. The size of the lookup table depends upon the number of tone levels. For example, if there are 256 tone levels, the table would be 256×256×256. In one specific embodiment, the lookup table may include 256 tables, each table being 256×256. The 256 tables would correspond to each of the 256 potential C values. Each table would have the M values on one axis and the Y values on the other axis. Thus, given the CMY values for the pixel, the C value would identify the applicable table, and the M and Y values would identify the particular weighting coefficient in the applicable table. An optimization process may be used to find the values of the weighting coefficient that provide the best image reproduction results. Alternatively, the values of the weighting coefficients can be set arbitrarily.

Figure 4:
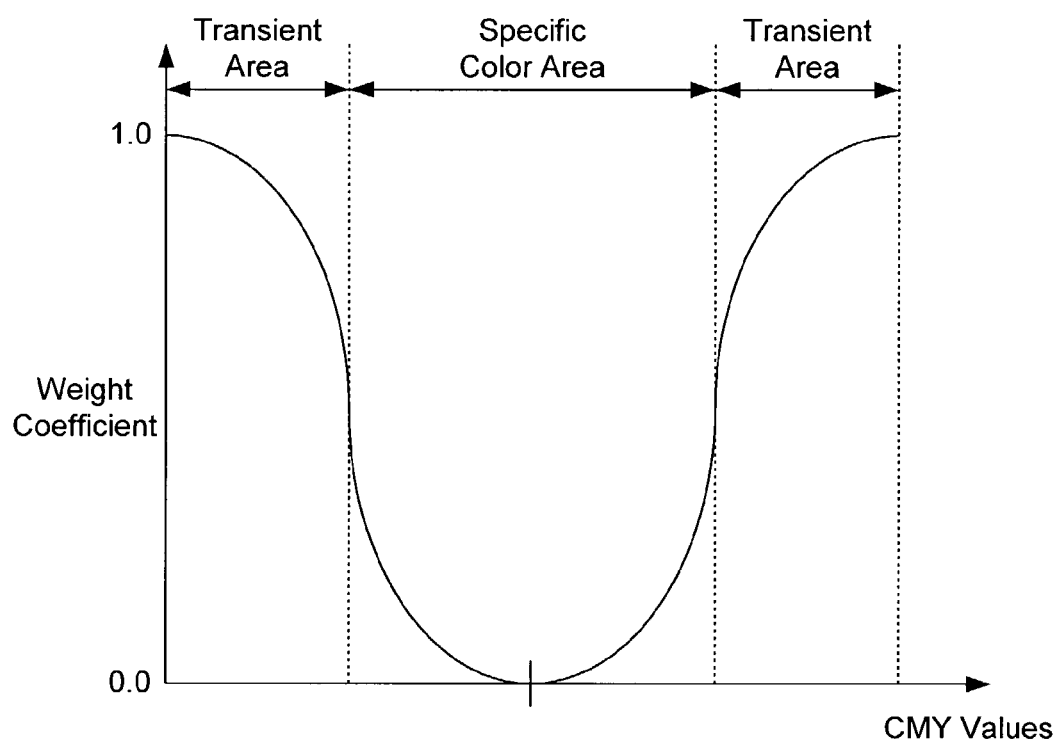
FIG. 4 is a graphical representation for setting the weighting coefficient consistent with the present invention.

FIG. 4 is a graphical representation for setting the weighting coefficient consistent with the present invention. As shown in FIG. 4, the value of the weighting coefficient is closer to zero when the pixel is in a specific color area, i.e., a non-black color area. The value gradually increases in the transient area until it reaches one. The value of the weighting coefficient as determined from the graph is determined from the CMY values of the pixel. It should be understood that more than one CMY value is capable of having the same weighting coefficient value.

The weighting coefficient α generated by the color region detection processor 125 corresponds generally to the closeness of the CMY values to each other. The closeness of the values can be determined according to a variety of different criteria. For example, the CMY values for the pixel can be considered close if the differences between each of the values are less than some threshold. The differences may be an absolute difference or based on a percentage according to the number of tone levels. For example, the CMY values for the pixel are 15/15/10, respectively, the absolute differences would be 0 (C-M), 5 (M-Y) and 5 (C-Y). The values are found to be close if each of these absolute differences are less than some threshold.

The percentage differences are based on the number of tone levels, such as 256. Each CMY value is calculated as a percentage of the total number of tone levels, and differences are calculated from the percentages. Where the CMY values for the pixel are 15/15/10 and the total number of tone levels is 256, the corresponding percentages would be (1500/256)% (i.e., percentage=(15/256)*100), (1500/256)%, and (1000/256)%. The differences between each value are then calculated for each percentage, and the values are found to be close if each of the differences in percentage is less than some threshold. In addition to using the absolute differences and differences in percentage, other processes may be used to determine if the values of the CMY data are close to each other.

The absolute differences, differences in percentage or other processes may be used to calculate the values for the weighting coefficient. For example, if the calculated values exceed the corresponding threshold, the weighting coefficient α would be given a value of one. If the calculated values are below the threshold, then the weighting coefficient α would be given a value of less than one and equal to or greater than zero. The closer the values are to each other, the closer the value of the weighting coefficient α is to zero. For example, if the CMY values for the pixel are 15/15/15, then the value of the weighting coefficient α would be 0.

The CMY data from the image quality processor 120, the K data from the black generation processor 130, and the DSC signal and weighting coefficient α from the color region detection processor 125 are all received by the color adjustment processor 135. The color adjustment processor 135 alters the value of the K data based on this received information (step 370). If the DSC signal equals one or otherwise indicates that the pixel is in a non-black color region, the K value is adjusted based on the closeness of the CMY values to generate an adjusted K value, referred to as the K' value. This adjustment can be done using the weighting coefficient α. In particular, the K' value can be calculated as the product of the K value received from the black generation processor 130 and the weighting coefficient α. For example, if the K value is 15 and the weighting coefficient α is 0.2, the K' value would be 3. The adjustment of the K value reduces or eliminates the amount of black for the pixel.

In an example of a skin color region, typical CMY values for a pixel would be C=142, M=208 and Y=170. Using these values, the color region detection processor 125 would set a weighting coefficient α of, for example, 0.1. The black generation processor 130 would calculate a K value of 142 and would output a value of one for the DSC signal because the pixel is in a non-black color region, i.e., a skin color region. Since the DSC signal is one, the color adjustment processor 135 adjusts the K value with the weighting coefficient α. In this case, the K' value would be the product of the K value, 142, and the weighting coefficient α, 0.1, which equals 14.

In addition to adjusting the K value of the CMYK data, the color adjustment processor can also translate the CMY data to C'M'Y' data (step 380). This translation can be implemented by reducing the value of each of the CMY data by the K' value, i.e., C' equals the C value minus the K' value, M' equals the M value minus the K' value, and Y' equals the Y value minus the K' value. Using the exemplary values described above for the CMY and K' values 142, 208, 170 and 14, respectively), the resulting C'M'Y' values would be 128, 194 and 156, respectively.

The color adjustment processor 135 may also be implemented in hardware, in software or some combination thereof, such as an integrated circuit or as part of a software application operating on a computing device. In addition to adjusting the value of the K data received from the black generation processor 130, the color adjustment processor 135 outputs the CMYK data to the halftoning processor 140.

The halftoning processor 140 provides halftone processing on the C'M'Y'K' data received from the color adjustment processor 135. Like the other processors of the color conversion system, the halftoning processor 140 may be implemented in hardware, in software or some combination thereof, such as an integrated circuit or as part of a software application operating on a computing device.

The C'M'Y'K' data output from the halftoning processor 140 may be stored in a storage area of a memory. The memory may be located in a computing device in a network coupled to the color conversion processor by a communication link. The communication link may be over a local area network (LAN) or over a public network, such as the Internet. The memory may also be located in a hardcopy devices, such as a multi-function device that incorporates the scanner 110 and the printer 145.

In addition to storing the C'M'Y'K' data in a memory, the C'M'Y'K' data can be output to the printer 145. The printer 145 receives the C'M'Y'K' data, either from the memory in which the C'M'Y'K' data was stored or from the color adjustment processor 135, and prints an image according to the C'M'Y'K' data. With the K' data adjusted according to the operation of the color region detection processor 125 and the color adjustment processor 135, the amount of black in non-black color regions can be reduced or eliminated in the reproduction in the scanned image.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for processing image data, comprising:
    generating color image data from a scanned image, the color image data including RGB data;
    converting the RGB data to CMY data;
    translating the CMY data for a pixel to CMYK data;
    calculating the differences between each of the values of the CMY data for the pixel, wherein the values of the CMY data for the pixel are close to each other if each of the calculated differences is less than a predetermined threshold;
    setting a weighting coefficient for a pixel based on the values of the CMY data for the pixel;
    identifying a particular region in which the pixel is located as a black color region or a non-black color region; and
    altering the value of the K data for the pixel based on the weighting coefficient if the particular region is a non-black color region.

2. A method according to claim 1, further comprising setting the weighting coefficient at one if any of the calculated differences are greater than the predetermined threshold.

3. A method according to claim 1, wherein the value of the weighting coefficient is between 0 and 1.

4. A method according to claim 3, wherein the value for the weighting coefficient increases as the differences between each of the values of the CMY data for the pixel increase.

5. A method according to claim 1, wherein the value of a weighting factor is determined from a lookup table based on the CMY data for the pixel.

6. A method according to claim 1, wherein the particular region is a black color region or a non-black color region based on the values of the CMY data of pixels in the particular region.

7. A method according to claim 1, wherein the particular region includes a predetermined number of pixels adjacent to the pixel.

8. A computer system for processing image data, comprising:
    a processor; and
    a memory, coupled to the processor, the memory comprising a plurality of instructions executed by the processor, the instructions configured to:
    generate color image data from a scanned image, the color image data including RGB data;
    convert the RGB data to CMY data;
    translate the CMY data for a pixel to CMYK data;
    calculate the differences between each of the values of the CMY data for the pixel, wherein the values of the CMY data for the pixel are close to each other if each of the calculated differences is less than a predetermined threshold;
    set a weighting coefficient for a pixel based on the values of the CMY data for the pixel;
    identify a particular region in which the pixel is located as a black color region or a non-black color region; and
    alter the value of the K data for the pixel based on the weighting coefficient if the particular region is a non-black color region.

9. A computer system according to claim 8, the memory further comprising an instruction configured to set the weighting coefficient at one if any of the calculated differences are greater than the predetermined threshold.

10. A computer system according to claim 8, wherein the value of the weighting coefficient is between 0 and 1.

11. A computer system according to claim 10, wherein the value for the weighting coefficient increases as the differences between each of the values of the CMY data for the pixel increase.

12. A computer system according to claim 8, the memory further comprising an instruction configured to determine the value of a weighting factor from a lookup table based on the CMY data for the pixel.

13. A computer system according to claim 8, wherein the particular region is a black color region or a non-black color region based on the values of the CMY data of pixels in the particular region.

14. A computer system according to claim 8, wherein the particular region includes a predetermined number of pixels adjacent to the pixel.

15. A computer readable medium operable on a computer system configured to process image data, the computer readable medium configured to:
    generate color image data from a scanned image, the color image data including RGB data;
    convert the RGB data to CMY data;
    translate the CMY data for a pixel to CMYK data;
    calculate the differences between each of the values of the CMY data for the pixel, wherein the values of the CMY data for the pixel are close to each other if each of the calculated differences is less than a predetermined threshold;
    set a weighting coefficient for a pixel based on the values of the CMY data for the pixel;
    identify a particular region in which the pixel is located as a black color region or a non-black color region; and
    alter the value of the K data for the pixel based on the weighting coefficient if the particular region is a non-black color region.

16. A computer readable medium according to claim 15, further configured to set the weighting coefficient at one if any of the calculated differences are greater than the predetermined threshold.

17. A computer readable medium according to claim 15, wherein the value of the weighting coefficient is between 0 and 1.

18. A computer readable medium according to claim 17, wherein the value for the weighting coefficient increases as the differences between each of the values of the CMY data for the pixel increase.

19. A computer readable medium according to claim 15, further configured to determine the value of a weighting factor from a lookup table based on the CMY data for the pixel.

20. A computer readable medium according to claim 15, wherein the particular region is a black color region or a non-black color region based on the values of the CMY data of pixels in the particular region.

21. A computer readable medium according to claim 15, wherein the particular region includes a predetermined number of pixels adjacent to the pixel.

* * * * *